Sept. 15, 1970  J. M. NELSON  3,528,680
SUSPENSION FOR VEHICLES
Filed Oct. 20, 1967  2 Sheets-Sheet 1
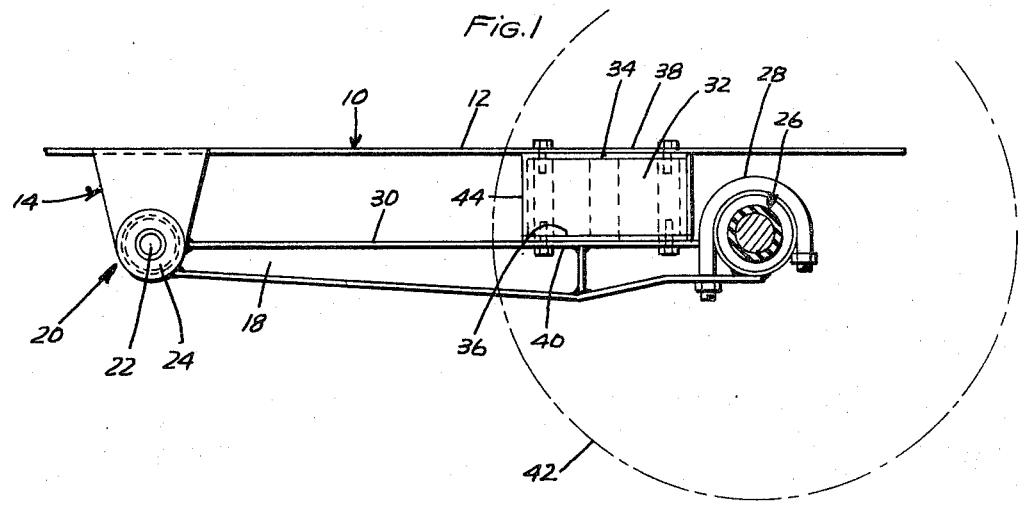
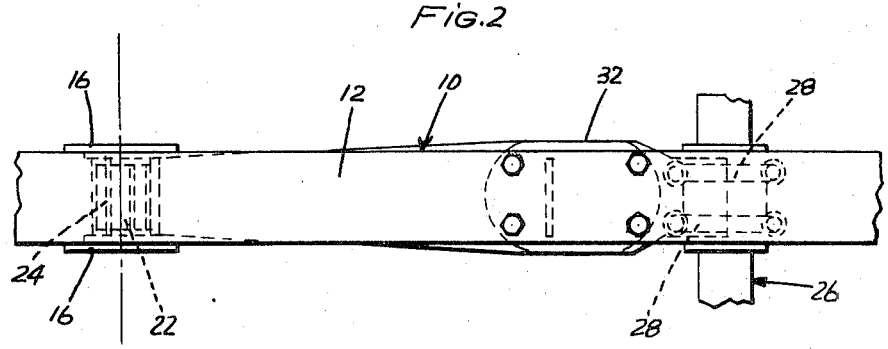
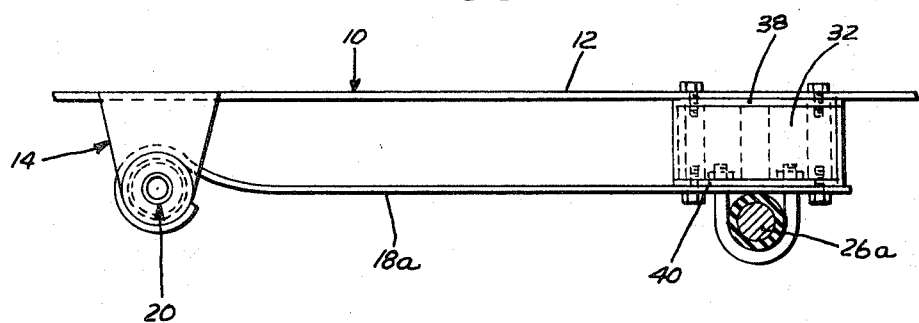
INVENTOR:
JOHN M. NELSON,
BY Hood, Gust & Irish
ATTORNEYS.

Sept. 15, 1970 J. M. NELSON 3,528,680
SUSPENSION FOR VEHICLES
Filed Oct. 20, 1967 2 Sheets-Sheet 2
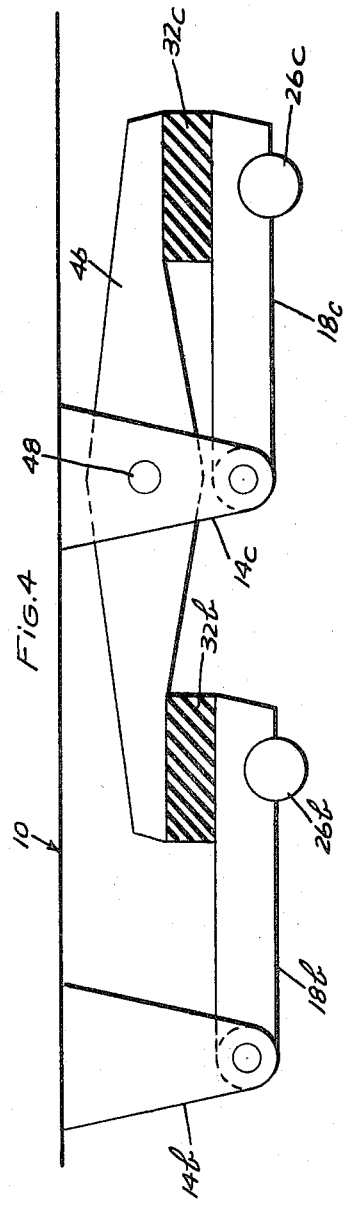
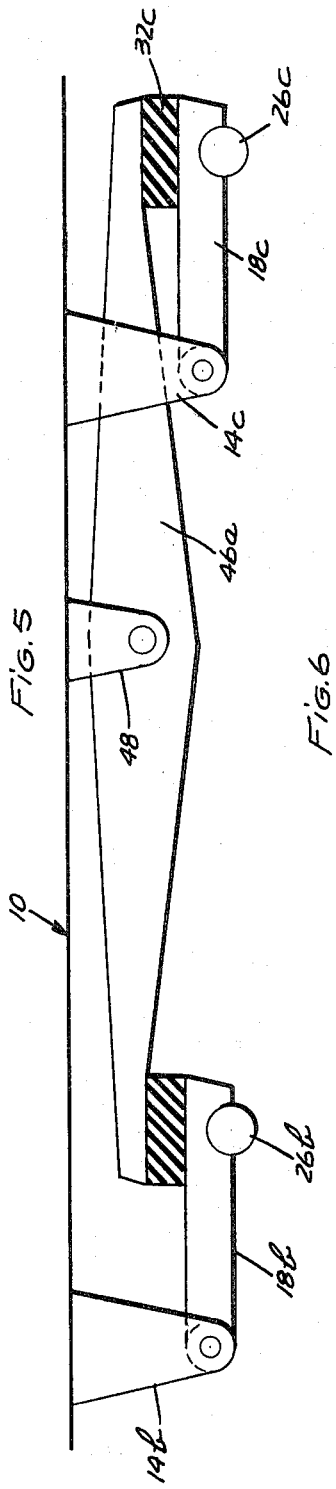
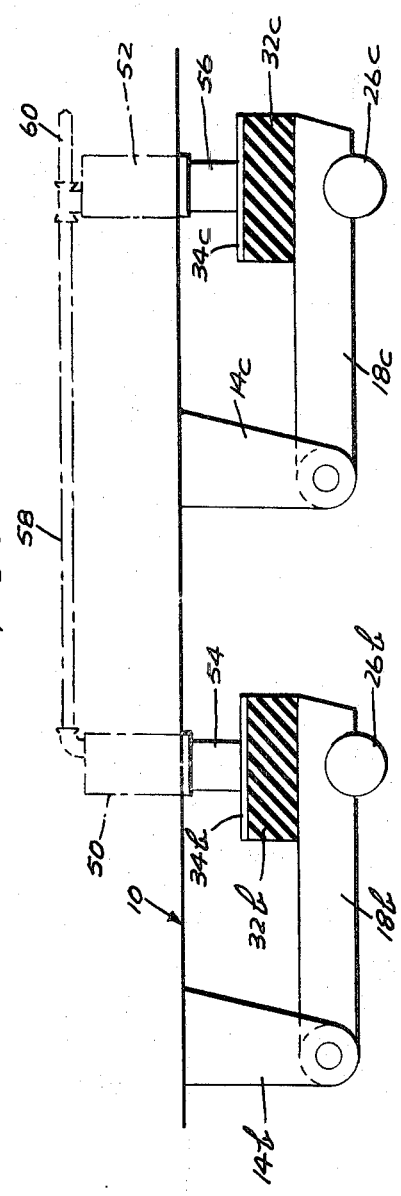
INVENTOR:
JOHN M. NELSON,
BY Hood, Gust & Irish
ATTORNEYS.

United States Patent Office 3,528,680
Patented Sept. 15, 1970

3,528,680
SUSPENSION FOR VEHICLES
John M. Nelson, Rte. 2, Ottawa, Ohio 45875
Filed Oct. 20, 1967, Ser. No. 676,752
Int. Cl. B60g 11/32
U.S. Cl. 280—124                                    16 Claims

ABSTRACT OF THE DISCLOSURE

This invention includes a unique suspension arrangement which employs a body of resilient deformable and compressible microcellular material interposed in load-bearing relation between the vehicle frame and axle structure, this body having upper and lower surfaces which are respectively bonded or otherwise secured to the frame and the axle structure. The material of the body is a blown urethane elastomer having a multiplicity of microminiature compressible cells which render the body resiliently compressible, the body having length and thickness dimensions which support a predetermined load that partially but not fully compresses the cells, thereby providing the cells with the capability of further compression for supporting resiliently a load in addition to the predetermined load. The body serves the dual purpose of providing both spring and rebound functions. By reason of the compressibility, road shocks are cushioned. By reason of the secure attachment of the body to the opposite portions of the vehicle, the body serves as the resilient connection which limits axle rebound. By means of the body itself serving the dual function as a spring and rebound element, structure normally used to provide rebound action can be eliminated from the suspension system.

BACKGROUND OF THE INVENTION

Field of the invention

The present invention relates to a novel suspension for a vehicle, and more particularly to an improved suspension utilizing a blown or expanded urethane material which is both deformable and compressible in providing for the usual relative spring and rebound motion between vehicle frames and axles.

DESCRIPTION OF THE PRIOR ART

In the usual suspension system, the spring elements are separate from the rebound devices, such spring elements ordinarily taking the form of metallic springs, such as leaf or helical type, and air bags. In some instances, rubber has been used as spring elements, but this use has been attended with complications because of the noncompressible nature of rubber. Merely inserting a body of rubber between two elements which are relatively movable toward and away from each other does not provide the spring action necessary for a vehicle suspension, the reason for this, as just stated, being due to the noncompressible nature of rubber. Air cushions, of course, can distort and compress. Helical springs compress and leaf springs bend in providing the springing action.

However, in many instances involving these prior art spring systems, separation of the relatively movable suspension parts has been limited by means of rebound devices which may take the form of elastic cords, lost-motion structures which limit the separation movement, the bottoming of pistons in shock absorbers, and the like.

SUMMARY OF THE INVENTION

In accordance with the broader aspects of this invention, the springing and rebound actions are incorporated into a single element which materially simplifies suspension constructions. In this invention, there is provided a vehicle frame and axle having a spring body of resiliently deformable and compressible microcellular material interposed in load-bearing relation therebetween, this body having upper and lower surfaces which are fixedly secured to portions of both the frame and the axle structure. The axle is movable toward and away from the frame in normal operation. The material of the body is a blown urethane elastomer having a multiplicity of microminiature compressible cells which renders the body resiliently compressible, the body having length and thickness dimensions which support the empty vehicle load that partially but not fully compresses the cells, thereby providing the cells with the capability of further compression for supporting resiliently a load in addition to the vehicle itself. Because of the fixed attachment of the upper and lower surfaces of the body to the frame and axle structure, respectively, as the axle structure movably separates from the frame, the body tends to stretch and thereby resists this separation. Because of the unique characteristics of the material of the body, the greater the separation, the greater is the resistance to the separation exerted by the body. Thus, not only does the body serve as a spring element, but it also serves as a rebound device. This invention involves the incorporation of this body into a vehicle suspension system in a unique way whereby the rebound and spring characteristics of the body may be fully utilized.

It is an object of this invention to provide an improved vehicle suspension system wherein an expanded or blown urethane polymer having predetermined resilient and load-supporting characteristics may be used for providing both spring and rebound action in a suspension system between a vehicle frame and axle structure.

It is another object of this invention to provide a suspension system for load-carrying vehicles which is simple in construction, inexpensive, durable and uniquely arranged such that the spring element utilized therein also serves as a rebound element.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view, partially in cross-section, of the basic embodiment of this invention;

FIG. 2 is a fragmentary and top view of the embodiment of FIG. 1;

FIG. 3 is a side view, again partially in cross-section, of a slightly different embodiment of the arrangement of FIGS. 1 and 2;

FIG. 4 is a side view, in diagrammatic form, of a tandem suspension system in which the basic structures of the preceding embodiments are used;

FIG. 5 is a side view, in diagrammatic form, of still another embodiment of this invention; and FIG. 6 is a side view, in diagrammatic form, of yet another embodiment of this invention which utilizes hydraulic devices instead of the mechanical apparatuses of the preceding figures.

Referring to the drawings, a conventional, suitable strong vehicle frame is generally indicated by reference numeral 10, this frame in some instances being in the form of the steel I-beam having a flat under surface 12. Rigidly secured to and depending from said frame, on opposite sides of the vehicle, are hanger devices, indicated generally by numeral 14. Inasmuch as the mechanisms on opposite sides of the vehicle are identical, a description of one of these will suffice for both. As shown in both FIGS. 1 and 2, each hanger device 14 comprises two steel or the like depending plates 16 which are spaced apart and parallel and are secured to the underside 12 of frame 10 in some suitable manner such as by welding.

A radius arm 18, suitably strong and rigid, is pivotally mounted by means of a rubber bushed assembly, generally indicated by reference numeral 20, on the lower end of the hanger device 14 between the two plates 16 as shown. The assembly 20 includes a pivot pin 22 secured at its opposite ends to plates 16 and a rubber bushing 24 which is rotatably mounted on pin 22. The left-hand end of the radius arm 18 has an opening therein which fits over the bushing 24, thereby allowing the radius arm 18 to swing vertically. Otherwise, the structure is so arranged that not only can the radius arm 18 swing vertically, but it can also tilt laterally for a reason which will be explained later on. The rubber contained in the bushing 24 permits this lateral or tilting motion.

The radius arm 18 normally extends rearwardly of the vehicle in parallelism with frame 10 as shown in FIG. 1 of the drawings. Also, arm 18 is disposed beneath and spaced from the frame 10.

On the right-hand end of radius arm 18 is securely mounted an axle structure, indicated by numeral 26. The particular mounting for this axle structure 26 includes the U-bolts 28 which straddle axle structure 26 and are secured to radius arm 18 as shown.

The particular radius arm 18, as shown, in general corresponds to a conventional steel I-beam, providing a substantially flat upper surface 30 which is arranged substantially parallel to the under surface 12 of frame member 10. Mounted between the facing flat surfaces 12 and 30, and immediately adjacent to the axle structure 26, is a spring body 32 of blown urethane material which has resilient and load-bearing qualities. As shown in FIGS. 1 and 2, this body 32 is substantially rectangular in shape with the exception of the opposite ends which are part-cylindrical. The upper and lower surfaces 34 and 36 thereof are flat and parallel so as to fit between the respective flat surfaces 12 and 30 of the frame and radius arm, respectively.

Of importance is the fact that the body 32 is fixedly attached to the frame 10 and radius arm 18. This is accomplished by bonding the two body surfaces 34 and 36 to a pair of steel plates 38 and 40, respectively. These steel plates 38 and 40 in turn are securely engaged with the respective flat surfaces 12 and 30 and bolted to the frame 10 and arm 18 as shown. While several bonding agents are available, any one of them which will provide the necessary strong bond to prevent tearing of the body 32 from the plates 34 and 36 during use will be satisfactory. As the radius arm 18 moves vertically toward and away from the frame 10, the body 32 will be resiliently deformed. The properties of body 32 and the attachments thereof limit the movement of the radius arm 18 in a similar manner as conventional spring and rebound devices, these devices in prior art arrangements being entirely separate structures whereas in the present invention they are combined into a single structure, namely the body 32.

In operation, body 32 is compressed somewhat under the empty load of the vehicle. This condition is shown in FIG. 1, wherein the radius arm 18 extends substantially parallel to the frame 10. As the vehicle is driven over rough ground and the wheel 42 is raised as a consequence of moving over an elevated bump, the axle 26 is raised, thus pivotally moving the radius arm 18 about the pin assembly 20 and compressing body 32. Upon dropping of the wheel because of a depression, the radius arm pivots oppositely, thereby tending to stretch the body 32. This is unique in the art, inasmuch as conventional suspensions utilize rebound devices other than the spring element which serve to limit the separation between the axle structure and vehicle frame member. In this invention, the body 32 itself not only serves as a spring, but also as the rebound device. By reason of the secure attachment of body 32 to the frame 10 and arm 18, the body 32 cannot separate therefrom, thereby making it possible to utilize the inherent characteristics of the body material in performing the springing and rebounding functions.

Any lateral tilting necessary in the suspension is provided by the rubber bushed assembly 20 as well as the spring body 32 itself.

If desired, a conventional arrangement of torque arms may be connected between the radius arm 18 and the vehicle frame 10, such an arrangement of torque arms being shown in Nelson Pat. No. 3,323,811, issued June 6, 1967.

The body 32 is of a blown urethane polymer material which can be based upon either a polyalkylene ether glycol or a polyester glycol. However, as some polyester based urethanes are hydrolyzed, as indicated by the paper entitled "Water Resistance of Liquid Urethane Vulcanizates," by Robert J. Athey, Contribution No. 206, presented before the SPE Regional Technical Conference, Washington, D.C. on June 4, 1964, and, therefore, in the presence of water, are reversibly plasticized or irreversibly hydrolyzed, the polyether based urethanes are preferable. The following urethanes, however, would be satisfactory for the application for this invention, if they were blown so as to have the load-bearing and compression characteristics required by this invention and the material was stable so these characteristics could be maintained over a relatively long period of time:

POLYETHERS

Polytetramethylene ether glycol=tolylene diisocyanate
Polytetramethylene ether glycol=diphenylmethane dianate
Polytetramethylene ether glycol=m-phenylene diisocyanate
Polypropylene ether glycol=tolylene diisocyanate

POLYESTERS

Polyethylene propylene adipate glycol=tolylene diisocyanate
Polyethylene propylene adipate glycol=diphenylmethane diisocyanate
Polyethylene adipate glycol=1,5-naphthalene diisocyanate These materials properly blown include a multiplicity of microminiature compressible cells, either open or closed, the closed cells being relatively gas-tight enclosures. Each body 74 and 76 has a thickness between the walking beam and radius arm which supports a predetermined load that partially but not fully compresses the cells. Such cells are therefore capable of further compression for supporting resiliently a load in addition to the predetermined load. This predetermined load may, of course, be the empty weight of the vehicle, and the additional load that of material or products being hauled on the vehicle.

In general, the blown urethane polymer material, as aforementioned, is formed from a prepolymer made from a polyester or polyether resin. The blowing or expanding agents may be compounds which react chemically to produce gases such as carbon dioxide or nitrogen or compounds which expand physically from liquid to gas at the processing temperature used. An example of the latter would be methylene-chloride. Depending upon the expanding agents or chemical reactions used, the cell structure will be either open or closed or a combination of both. See, for an exemplary discussion of the blowing, and the control thereof, of a polytetramethylene ether glycol-tolylene diisocyanate urethane, a bulletin published by E. I. du Pont de Nemours & Co. entitled "Closed Cell Sponge from Adiprene L Urethane Rubber," by Robert P. Kane, Contribution 194, Nov. 2, 1964.

One suitable polyether based urethane elastomer for use in this invention is the polytetramethylene ether glycol-tolylene diisocyanate polymer as sold by E. I. du Pont de Nemours & Co. under their trademarks Adiprene L-100 and L-167. This polymer having a pre-reaction density of about 70 pounds per cubic foot, when blown to a density of about 15 to 50 pounds per cubic foot, is suitable for the body 32. Both Adiprene L-100 and L-167 or mixtures of the two can be blown by carbon dioxide, nitrogen, or methylene chloride as exemplified by the following examples, the quantities being in parts by weight:

EXAMPLE 1

| | Parts |
|---|---|
| Polytetramethylene ether glycol-tolylene diisocyanate prepolymer | 100.00 |
| A paste of finely divided black iron oxide and a polyester resin | 2.0 |
| Methylene-bis-orthochloroaniline | 9.7 |
| Triethylene diamine | 0.1 |
| Dimethyl polysiloxane polyoxyalkylene copolymer | 2.0 |
| Water | 0.2 |

The dimethyl polysiloxane polyoxyalkylene copolymer and a paste of finely divided black iron oxide and a polyester resin are mixed mechanically into the polytetramethylene ether glycol-tolylene diisocyanate prepolymer which has been preheated to 50° C. to prevent crystallization of the high melting ingredients. Molten methylene-bis-orthochloroaniline at 120° C. is then added followed by a mixture of the required amount of water into which has been predissolved the triethylene diamine. The resulting mixture is agitated for 20 to 30 seconds and then poured into a mold which is immediately closed except for minute drilled holes in the lid which allow the escape of air ahead of the expanding urethane. Previous to the above step, steel, aluminum or plates of other material which had been cleaned by sandblasting or the like and coated with a bonding agent were placed in the bottom and top parts of the mold such that the urethane becomes thoroughly bonded to the plates during the expanding and curing portion of the reaction.

The final density of the foam is controlled by the amount (weight) of charge placed in the mold.

EXAMPLE 2

| | Parts |
|---|---|
| Polytetramethylene ether glycol-tolylene diisocyanate prepolymer | 100.0 |
| Silicone surfactant (Dow Chemical's DC-200) | 2.0 |
| Methylene-bis-orthochloroaniline | 12.0 |
| Finely divided silica | 5.0 |
| Nitrosan (E. I. du Pont de Nemours & Co.) | 3.5 |

The polytetramethylene ether glycol-tolylene diisocyanate prepolymer is thoroughly mixed with the silicone surfactant and maintained at 50° C. Separately, the methylene-bis-orthochloroaniline is maintained at 120° C. Also separately, the silica and the Nitrosan are maintained at room temperature.

The five separate ingredients are placed in a container maintained at 100° C. and thoroughly mixed therein. The resulting mixture is placed in a mold which is then closed. The mixture is blown into a foam by nitrogen gas resulting from the reaction. The foam is cured in the mold for 45 minutes and then oven cured for 60 minutes at 100° C. The final density of the foam is controlled by the amount (weight) of charge placed in the mold.

EXAMPLE 3

| | Parts |
|---|---|
| Polytetramethylene ether glycol-tolylene diisocyanate prepolymer | 100.0 |
| Dimethyl polysiloxane polyoxyalkylene copolymer | 1.0 |
| A paste of finely divided black iron oxide and a polyester resin | 0.5 |
| $CH_2Cl_2$ | 8.0 |
| Eutectic mixture of 58.2% cumene-diamine and 41.8% m-phenylene-diamine | 6.6 |

The polytetramethylene ether glycol-tolylene diisocyanate prepolymer, the dimethyl polysiloxane polyoxyalkylene copolymer, the paste of finely divided black iron oxide and a polyester resin, and the $CH_2Cl_2$ are thoroughly agitated in a machine having a very accurate temperature control mechanism and maintained at 50 to 85° C. The volume of the final product varies greatly with this temperature. The mixing machine must have a mixing capacity greater than 20 lbs. per minute. The eutectic mixture is maintained separately at 40° C.

These two separate ingredients are now thoroughly mixed in a machine having a high shear mixing head and discharged directly into a mold preheated to a temperature of 115° C. which is immediately thereafter closed. The resulting mixture is blown into a foam by the $CH_2Cl_2$ which is the preferred agent because it conduces to faster processing. The foam is cured in the mold for 3 to 5 minutes and then oven cured at 100° C. for 60 minutes. The final density of the foam is controlled by the amount (weight) of charge placed in the mold.

In the manufacture of the closed cell material, tiny cells, microminiature in size, are formed within which gas, such as carbon dioxide, is trapped. This gas results from either the chemical or physical reactions involved in the manufacturing process. The individual cells thus may be regarded as separate, hermetically sealed or relatively gas-tight enclosures resembling inflated rubber balloons which may be compressed, deformed and the like without the gas escaping. Further information regarding the characteristics of other suitable forms of this material may be found in the bulletin dated Jan. 21, 1964, published by the aforementioned E. I. du Pont de Nemours & Co.

The body 32 may be enclosed by a peripheral protective skin layer 44. Body 32, however, is also preferably substantially homogeneous. Skin 44, further, is preferably substantially of the same composition as the remaining material of the body 32 and is preferably impervious to fluids, and thus, must be substantially without openings, without portions of the microminiature cells, or other perforations. Further, skin 44 desirably has chemical properties substantially the same as the remaining body material.

A suitable skin 44 is formed during the molding of body 32 and is a result of the peripheral portion of the body 32 being in contact with the relatively cold mold. Thus, the thickness of the skin 44 can be controlled by controlling the temperature of the mold. For example, if the mold temperature at all times is equal to the temperature of the remainder of body 32, no skin 44 is formed on body 32. As the mold temperature is maintained progressively lower than the temperature of the remainder of the body 32, the thicker the skin 44 becomes.

The thickness of the skin 44 must be controlled for the purposes of this invention. If the skin 44 is too thick ("too thick" in a specific embodiment is in excess of 0.03 inch), the skin 44 will buckle or wrinkle unsymmetrically. This buckling will produce premature failures of the skin 44. However, through temperature control during casting of the body 32, the skin 44 will be integrally formed with and thus intimately bonded to the adjacent material and will appear indistinguishable from the adjacent material except for the lack of microminiature cells, and the skin 44 and the remaining material of the body 32 will flex together as a unit.

The body 32 being resiliently compressible and deformable, relative movement between the wheels and frame is accommodated by the spring of the body. Sudden, upward movement, for example, of the wheel 42 will result in volumetric compression of the body 32 in which the two surfaces 12 and 30 of the beam and radius arm 18, respectively, move closer together against the resilient force of the body 32 tending to spread the same apart. Because of the compressibility of the microminiature cells inside the body 32, the latter actually compresses and reduces in volume, each individual cell accommodating this. In the closed cell structure, the increased pressure built up in each cell exerts a force tending to restore the body 32 to its original shape.

In the open cell structure, the portions of the body between cells resemble spring elements which when deformed exert a restorative force resisting resiliently the deformation. These phenomena result in the body 32 acting as a spring capable of absorbing road shock and supporting heavy loads.

These phenomena also result in the body 32 acting as a rebound device, inasmuch as stretching or elongation of the body is opposed by the restorative force just mentioned which tends to return the body 32 to its normal shape. By reason of the firm attachment of the opposite surfaces 34 and 36 of the body 32 to the frame 10 and radius arm 18, respectively, radius arm 18 is securely but resiliently connected to the frame 10.

The improved operation is realized in the distribution and equalization of forces, a part of this being directly attributable to the relatively large size of the body 32 and the large supporting areas thereof. In distinct contrast with helical coil springs, the body 32 covers a substantial area of the respective radius arm and frame 10 such that the spring action is distributed over a relatively large portion thereof to provide for a softer, smoother ride as well as efficient absorption of road shock and load. The total suspension is rendered more durable because of the relatively large areas of distribution of the spring forces which reduce fatigue in localized portions of the radius arms and frame 10.

This operation of the bodies 32 is made possible, in part, by reason of the substantial strength of the material, which, in some instances, is ten (10) times stronger than rubber. The elastomer can therefore be used in blown or foam form for obtaining the necessary compressibility and resilience. By contrast, rubber blown to the same extent has such little strength that in the first instance it cannot support a load and, secondly, will rip apart during rebounding.

Repetitive flexing of the body 32 generates heat internally thereof which eventually dissipates into the atmosphere. This being true, the body 32 itself acts as somewhat of a shock absorber. Thus, not only does the body 32 serve as spring and rebound elements, but it also provides a shock-absorbing function essential to the provision of a smooth and safe ride in a vehicle.

A slightly different embodiment of this invention is illustrated in FIG. 3, where like numerals indicate like parts. Instead of using a rigid radius arm 18, this embodiment of FIG. 3 utilizes a conventional leaf spring for the radius arm 18a. The left-hand end of this leaf spring (radius arm 18a) is wrapped around and pivotally attached to the bushing assembly 20 such that the radius arm 18a can swing vertically. The upper surface of the arm 18a is flat and parallel to the under side of the frame 10 so that the mounting plates 38 and 40 of the spring body 32 can be securely bolted thereto. Operation of this embodiment of FIG. 3 is precisely the same as just described in connection with the arrangement of FIGS. 1 and 2 with the exception that the radius arm 18a being in the form of a leaf spring is capable of some longitudinal twisting movement such that lateral tilting of the axle structure 26a can be accommodated and in fact resiliently resisted to provide a stabilizing force. Thus, the rubber bushing assembly 20 alone is not relied upon to provide the tilting action. In some structures, it is possible to eliminate the rubber bushing assembly 20, pivotally mounting the left-hand end of the radius arm 18 directly on the pivot pin 20, reliance being placed upon the twisting capability of the arm 18a for providing the tilting action just described.

Referring to FIG. 4, a slightly different embodiment of this invention employing tandem axles is shown. Like numerals with suffix letters added will indicate like parts. In this arrangement, two trailing radius arms 18b and 18c are used, each being secured to horizontally spaced hangers 14b and 14c, respectively, as shown. The hanger-radius arm construction may be identical to that already described in connection with FIGS. 1 and 2. The axles 26b and 26c in this instance are disposed directly beneath the spring bodies 32b and 32c, respectively, as shown.

The spring bodies 32b and 32c are firmly secured to the respective radius arms 18b and 18c in the same manner as described in connection with FIGS. 1 and 2.

Equalization of a load between the two axles 26b and 26c is provided by means of a walking beam 46 which is pivotally mounted at its center on the hanger 14c for swinging movement about a horizontally extending pin 48. The opposite end portions of the walking beam 46 overlie and are secured to the bodies 32b and 32c as shown. These bodies 32b and 32c are securely attached to the end portions of the walking beam 46 in the same manner as described in connection with the arrangement of FIGS. 1 and 2, mounting plates 34 and 36 being bolted directly to the walking beam as well as to the radius arms.

The radius arms 18b and 18c are in fore and aft relation, respectively, such that as the vehicle moves leftwardly, the radius arms will be in trailing relation.

In operation, as the vehicle is driven over rough ground, upon the front axle 26b being raised as a consequence of the wheel rolling over an elevated bump, the radius arm 18b will be raised. This motion is transferred to the front end of the beam 46 by the spring body 32, causing the rear end of the beam to depress, thereby transmitting a portion of the load to the rear axle 26b via the body 32c and the radius arm 18c. The same motion happens in reverse when a rear wheel engages an elevated bump, a portion of the load imparted thereto being transferred to the forward wheel. The walking beam 46 is free to swing vertically in equalizing the load between the two wheels, and the radius arms 18b and 18c swing or move correspondingly.

The slightly different embodiment of FIG. 4 of this invention permits wider distribution of the load on two axles than does the suspension of FIG. 3. In this arrangement of FIG. 4, like numerals with suffix letters added will indicate like parts. In this embodiment, instead of the walking beam 46a being pivotally mounted on hanger 14c, it is pivotally mounted on a separate hanger 49 depending from the frame 10. This hanger 49 is disposed between the two hangers 14b and 14c which are separated farther than in the case of the design of FIG. 3. The walking beam 46a is somewhat longer than the walking beam 46 of FIG. 3, such that the load imparted to the two axles 26b and 26c may be distributed over more widely spaced points on the vehicle. Operation of this embodiment of FIG. 4 is substantially identical to that just described in connection with FIG. 3.

The equalizing principal of the embodiments of FIGS. 3 and 4 is accomplished in the arrangement of FIG. 5 through the use of hydraulic mechanisms. Here again, like numerals with suffix letters added will indicate like parts. In this arrangement, two hydraulic cylinders 50 and 52 are fixedly secured in an upright position to the vehicle frame 10 in vertical alignment with the respective spring bodies 32b and 32c. These cylinders 50 and 52 are provided with pistons 54 and 56, respectively, which reciprocate vertically, each of the pistons defining within the cylinders 50 and 52, respectively, variable volume chambers. Preferably, the two cylinder and piston arrangements are of identical construction.

Interconnecting the variable volume chambers of the two cylinders is a pipe 58. If the suspension arrangement shown in FIG. 5 is to have three axles or more, and the same radius arm-cushion assemblies, added thereto in tandem relation, the pipe 58 may be extended rearwardly as indicated by the stub 60. However, if only the two axles 26b and 26c are to be used, the stub 60 is sealed off. It will be assumed in this case that this stub 60 is sealed.

To the bottom ends of the pistons 54 and 56 are secured two steel plates 34b and 34c, respectively, which in turn are bonded as previously described to the upper surfaces of the spring bodies 32b and 32c. These spring bodies are also secured to the upper surfaces of the radius arms 18b and 18c.

The variable volume chambers and the pipe 58 in the hydraulic system are filled with either oil or grease, care being exercised to avoid the inclusion of any air or gas. As the radius arm 18b is raised upwardly, the piston 54 is also moved upwardly, tending to reduce the size of the chamber in the cylinder 50. This results in the displacement of fluid from the chamber, through the pipe 58 and into the chamber of cylinder 52. Since the fluid is incompressible, the piston 56 will be forced downwardly, thereby in turn tending to force the radius arm 18c downwardly. Thus, it will be seen that any loads imparted to one of the axles 26b, 26c will result in transmittal of a portion thereof to the other axle 26c, 26b. In this embodiment, the hydraulic system sreves in equalizing the load between the tandem axles while the spring bodies 32b, 32c serve the same springing and rebounding functions as described previously.

In the embodiments above disclosed, the various elements of the vehicle such as the frame, walking beams and hydraulic cylinder units are collectively defined as being a part of the vehicle "undercarriage." Specifically, the "undercarriage" of the vehicle includes a vehicle frame, radius arms, hanger brackets, bushings, mounting plates, pivot pins, U-bolts, a spring body, torque arms, walking beams, hydraulic cylinders, or other load-transmitting devices including hanger brackets, pivot pins, conduits, and any devices necessary for the operation of such load-transmitting devices.

While there have been described above the principles of this invention in connection with specific apparatus, it is to be clearly understood that this description is made only by way of example and not as a limitation to the scope of the invention.

What is claimed is:

1. A suspension for vehicles comprising a vehicle undercarriage, axle means disposed in load-bearing relation to said undercarriage, said undercarriage including a first member and a second member, said first member being movable with respect to said second member and disposed in load-bearing relation to said second member, a spring body of resilient, deformable and compressible microcellular material interposed in load-bearing relation between said first and second members, said material being a blown urethane polymer having a multiplicity of microminiature compressible cells which render the body resiliently compressible and deformable, said body having oppositely facing sides, one side being secured to said first member and the opposite side being secured to said second member, thereby rendering said body capable of limiting rebound between said first and second members, said body having length and cross-section dimensions which support a predetermined load that partially but not fully compress said cells thereby providing said cells with the capability of further compression for supporting resiliently a load in addition to said predetermined load.

2. The suspension of claim 1 wherein said second member is a vehicle frame, and said first member comprises a radius arm with said axle means connected to said radius arm adjacent one end thereof, means pivotally connecting said radius arm at the other end thereof to said frame, said body being secured to and between said frame and said radius arm thereby limiting the swing of said radius arm both toward and away from said frame.

3. The suspension of claim 2 wherein said body surfaces are flat and in general parallelism with each other, and further comprises two supporting plates respectively secured to said surfaces, said plates being movable with respect to each other with accompanying deformation of said body, said plates being secured to facing portions of said frame and said radius arm, respectively, whereby said body limits movement of said radius arm toward and away from said frame.

4. The suspension of claim 1 wherein said body is enclosed by a peripheral protective skin layer, said skin layer being substantially impervious to fluids, flexible, resilient and intimately bonded to the adjacent material of said body.

5. The suspension of claim 2 wherein said connecting means includes means for accommodating tilting action of said radius arm as well as pivotal movement, said radius arm being rigid and providing a mounting surface facing said frame, said bottom surface of said spring body being adhered to said mounting side thereby providing a connection between said frame and said radius arm which resists movement of the latter away from said frame.

6. The suspension of claim 5 in which said connecting means includes a pivot pin having a rubber bushing thereon with said radius arm being mounted on said bushing such that the latter permits lateral tilting of said radius arm.

7. The suspension of claim 5 in which said radius arm is a leaf spring capable of limited longitudinal twisting for accommodating tilting of said axle, said leaf spring extending substantially horizontally and having a horizontal mounting plate secured to the upper side thereof, the bottom surface of said spring body being adhered to said mounting plate thereby providing a connection between said frame and said radius arm which resists movement of the latter away from said frame.

8. The suspension of claim 7 in which said second member is a horizontally extending frame, said connecting means includes a rigid hanger depending from said second member, said radius arm being pivotally mounted on said hanger, said spring body being horizontally spaced from said hanger, and said axle being disposed beneath said spring body such that loads on said axle are transmited vertically to said spring body.

9. The suspension of claim 1 wherein said axle means includes two axles, said undercarriage having two first members in the form of a pair of radius arms, a rigid frame member, and a second member further comprising a walking beam for transmitting load from one axle to the other axle, said walking beam being connected to said frame member, means pivotally connecting each radius arm at one end thereof to said frame member, said radius arms being horizontally spaced and extending substantially horizontally in fore and aft relation, said radius arms further being rectilinearly aligned with respect to each other, there being two bodies vertically interposed between and secured to each radius arm and respective opposite end portions of said walking beam, thereby serving to limit movement away from said second member.

10. The suspension of claim 9 in which said second member is a walking beam extending substantially parallel to said radius arm and being disposed between said frame member and said radius arm, means pivotally mounting said walking beam on said frame member, one spring body being vertically interposed between one radius arm and one end portion of said walking beam, the other spring body being vertically interposed between the other radius arm and the other end portion of said walking beam, both spring bodies having the upper surfaces thereof adhered to said walking beams such that said spring bodies resiliently oppose separation between said arms and beam.

11. The suspension of claim 10 including two spaced supporting hangers depending from said frame member, said radius arms being pivotally mounted at one end on said hangers, respectively, said beam being pivotally mounted at its center on one of said hangers.

12. The suspension of claim 10 including two spaced supporting hangers depending from said frame member, said radius arms being pivotally mounted at one end on said hangers, respectively, a third hanger depending from said frame member at a location spaced from and between said two hangers, said beam being pivotally mounted at its center on said third hanger, the load from said two axles being transmitted to said frame member by means of said walking beam, said spring bodies serving both as springs and rebound devices.

13. The suspension of claim 1 wherein said axle means includes two axles, said undercarriage includes two first members in the form of radium arms, a rigid frame member comprising two spaced apart hydraulic cylinders fixedly mounted on said frame member, and two second members in the form of pistons reciprocably mounted in said cylinders, thereby defining two variable volume chambers, a conduit interconnecting the chambers of the two cylinders such that fluid may flow from one chamber to the other as one of them decreases and the other increases in size, means for attaching the upper surface of each body to a respective piston such that as said arms move vertically said pistons will tend to be moved oppositely to transmit load from one axle to the other.

14. The suspension of claim 13 in which said cylinders are vertically positioned such that said pistons are movable vertically, each piston having a mounting plate thereon, each said spring body being fixedly attached to the respective body such that movement vertically of the radius arm is imparted to the body tending to move the respective piston vertically.

15. A tandem suspension for vehicles comprising a vehicle undercarriage including a frame with a longitudinal axis, and a hanger device fixedly secured to said frame and depending therefrom, said second member comprising a walking beam pivotally mounted intermediate the ends thereof on said hanger device, respectively, for vertical swinging movement about a horizontal axis, said beam extending parallel to the longitudinal axis of said frame, two first members in the form of radius arms; means for pivotally mounting each of said radius arms at one end thereof to said frame for vertical swinging movement, said radius arms being disposed beneath and in spaced-apart load-bearing relation to said walking beam and said frame, a rear axle mounted on the rear arm, a front axle mounted on the front arm, said axles being adapted to receive wheels thereon, two spring bodies, each of said bodies being interposed between and having opposite sides respectively secured to a respective radius arm, and a respective opposite end portion of said walking beam, said bodies being of resilient deformable and compressible microcellular material, said material being a blown urethane polymer having a multiplicity of microminiature compressible cells which render the bodies resiliently compressible and deformable, each of said bodies having a cross section and a thickness between the walking beam and the respective radius arms which supports a predetermined load that partially but not fully compresses said cells thereby providing cells capable of further compression for supporting resiliently a load in addition to said predetermined load, each of said bodies having opposite portions, respectively, secured to the respective radius arm and walking beam between which the body is interposed, whereby each body not only serves as a spring element but also as rebound means.

16. The suspension of claim 13 in which said load-transmitting means includes two fluid pressure devices having variable volume chambers and being mounted on said frame member, each device having a first member comprising differential pressure movable element which determines the volume of the respective chamber, a conduit interconnecting the chambers of the two devices such that fluid may flow therebetween, means for attaching the upper surface of each body to a respective pressure element such that as said arms move vertically said pressure elements will tend to be moved oppositely to transmit load from one axle to the other.

References Cited

UNITED STATES PATENTS 3,215,384   11/1965   Chambers _____ 267—21 X
2,681,800   6/1954   Taylor _____ 267—63
1,817,436   8/1931   Geyer _____ 267—30

PHILIP GOODMAN, Primary Examiner

U.S. Cl. X.R.

267—21; 280—104.5

PO-1050
(5/69)

UNITED STATES PATENT OFFICE
CERTIFICATE OF CORRECTION

Patent No. 3,528,680      Dated September 15, 1970

Inventor(s) John M. Nelson

It is certified that error appears in the above-identified patent and that said Letters Patent are hereby corrected as shown below:

Column 9, line 20, change "sreves" to --serves--;
Column 9, line 73, Claim 3, change "wlth" to --with--;
Column 10, line 40, Claim 8, change "transmited" to
      --transmitted--;
Column 11, line 11, Claim 13, change "radium" to --radius--.

SIGNED AND
SEALED
DEC 22 1970

(SEAL)
Attest:

Edward M. Fletcher, Jr.
Attesting Officer

WILLIAM E. SCHUYLER, JR.
Commissioner of Patents